March 22, 1960     A. L. SEA     2,929,312

HAY BALER ATTACHMENT

Filed Jan. 21, 1959     3 Sheets-Sheet 1

Arnold L. Sea
INVENTOR.

BY *Clarence A. O'Brien*
and *Harvey B. Jacobson*
Attorneys

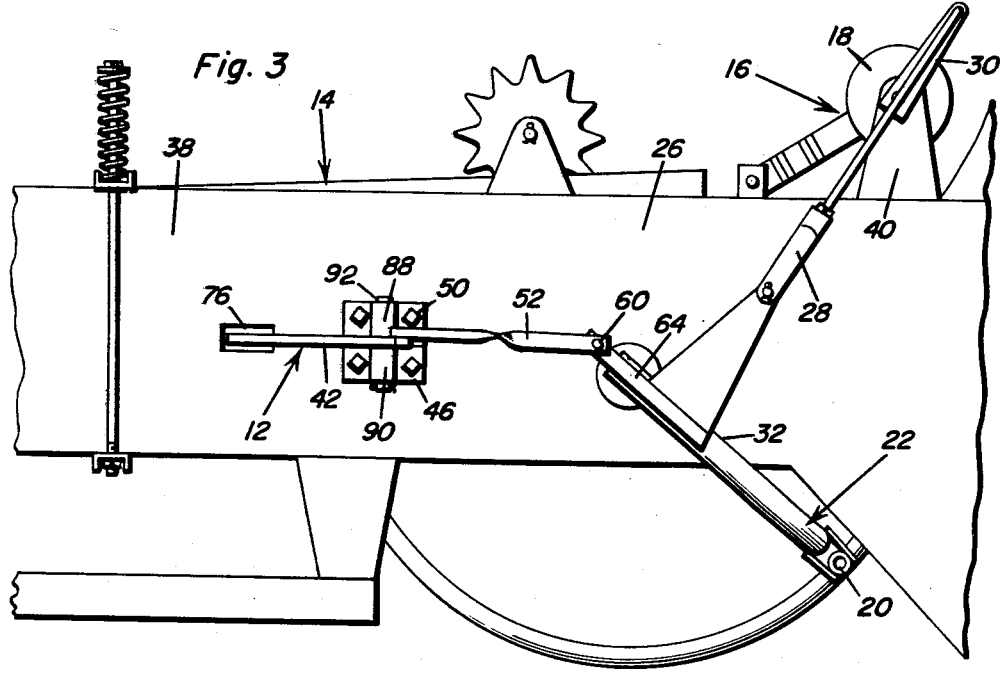
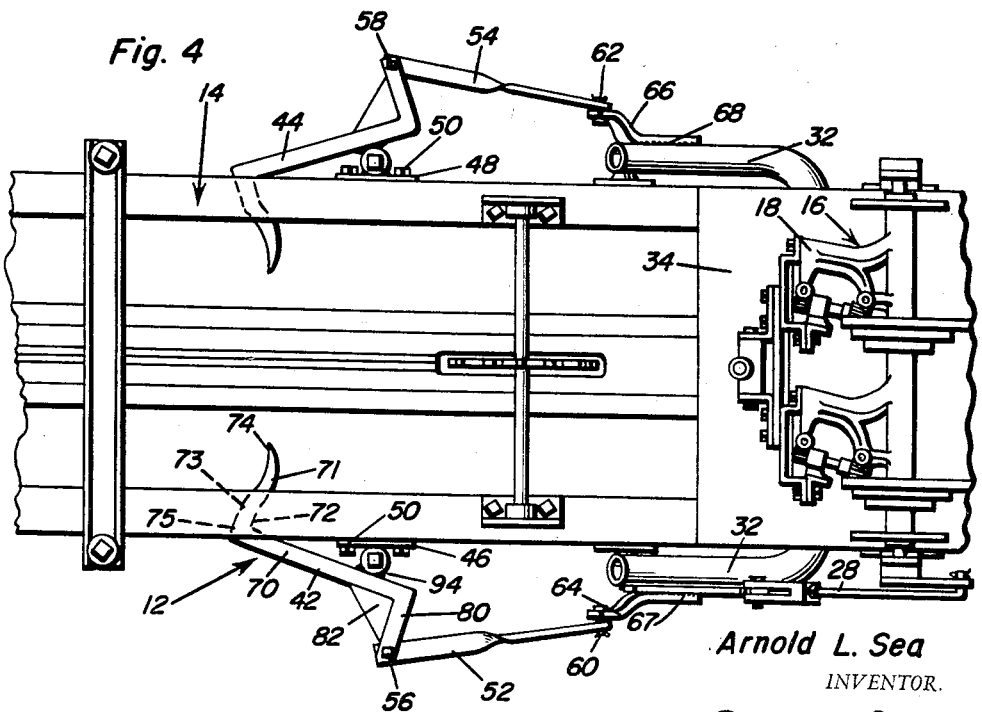

March 22, 1960 A. L. SEA 2,929,312
HAY BALER ATTACHMENT
Filed Jan. 21, 1959 3 Sheets-Sheet 3

Arnold L. Sea
INVENTOR.

United States Patent Office 2,929,312
Patented Mar. 22, 1960

2,929,312

HAY BALER ATTACHMENT

Arnold L. Sea, Sinai, Ky.

Application January 21, 1959, Serial No. 788,200

9 Claims. (Cl. 100—22)

This invention relates to hay balers and more particularly to an attachment which operates in conjunction with the baling operation in the hay baler chamber.

An object of the invention is to provide an arm and bracket assembly for improving the operation of the needle assembly of the baler, making it possible to operate the baler at a higher speed and with a much greater success in tying the hay bales.

A further object of the invention is to provide a hay arm to operate in coordination with the needle assembly of a hay baler, the hay arm being constructed in such a manner that it enters the baler chamber to interrupt the travel of the hay in the chamber, after which further movement of the arm functions as a pusher to tighten the bale at both ends by pushing on one end of the bale. This relaxes the top of the twine which is ordinarily under a strain at all times.

There are a number of problems existing in the tying of the twine by the tier of a hay baler. One principal problem is failure of the twine to be knotted either at one or both ends of the twine. A considerable step forward is made if this problem is overcome. The present invention provides means for overcoming this problem by relaxing the twine due to the small compression of the bale as it is being tied by the needle assembly and tier. This relaxation of the twine provides additional, useful twine for the process of making the knot by the tier so that the tier never fails to make a knot under any operating condition.

Furthermore, when this invention is used with a baler the bales are discharged from the baler both in a more uniform and solid condition.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side view of the baler in Figure 1 but showing the hay stop arm and needle assembly in a second position.

Figure 4 is a top view of the baler fragment in Figure 3.

Figure 1:
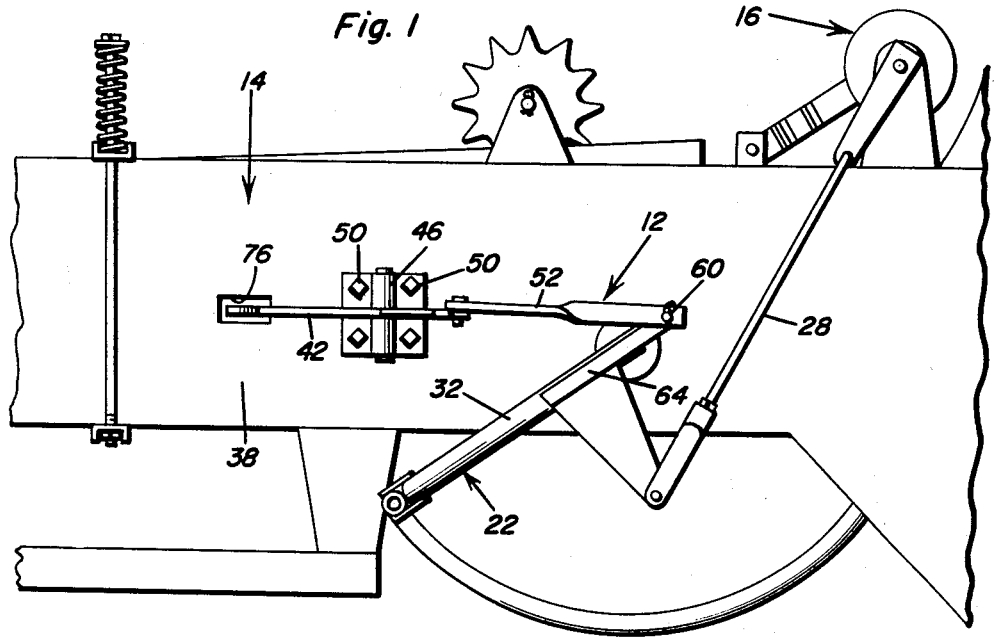
Figure 1 is a fragmentary side elevational view of a conventional baler equipped with a hay arm and bracket in accordance with the invention.

The invention provides an attachment for a conventional baler. The baler that is shown in the drawings is a currently commercially available "New Holland" manufacturer's make although it is to be understood that there are a number of balers on the market which could well use the hay stop arm assembly 12 which has been added to the illustrated baler 14. Many conventional parts of the baler are omitted from the drawings inasmuch as a baler is a complicated machine, and the hay stop arm assembly need not be illustrated as a part of the entire baler for a clear understanding of the hay stop arm assembly. Further, the hay stop arm assembly 12 functions to cause not only an improvement in the quality of bales but also to improve the normal operation of the tier 16. Tier 16 is diagrammatically illustrated, and for a complete illustration and description thereof including all of the gears, arms, brackets, etc. Reference is made to U.S. Patent No. 2,405,688 issued to C. F. Crumb on August 13, 1946. This patent discloses a typical tier which is exceedingly similar to the tier used as a part of baler 14. The tier 16 has a knotter 18 which operates in conjunction with the needles 20 of needle assembly 22. The knotter of tier 16 is mounted at the top of baler chamber 26 and is caused to operate in coordination with the needle assembly 22 by link 28 and arm 30 connected respectively with main arm 32 of the needle assembly and the knotter 18.

Baler chamber 26 has a top plate 34, a bottom wall 36 and a pair of side walls 38. Knotter 18 is located above top plate 34 and as is ordinarily the case, on a pair of upstanding brackets 40, however, this may vary from one manufacturer's make to the next. All of the preceding structure that has been mentioned, except the hay stop arm assembly 12, is conventional and more fully disclosed and described in not only the previously mentioned prior U.S. patent but disclosed for a number of years in other patents and in actual hay balers that are commonly used.

Hay stop arm assembly 12 is composed of a pair of hay stop arms 42 and 44, one being for the left side of baler chamber 26 and the other being for the right side of baler chamber 26. Each arm is identical except one is for the left side and the other is for the right side, and the means for operating the arms 42 and 44 are identical. Arm 42 is mounted on a bracket 46, while arm 44 is mounted on bracket 48. Bracket 46 is connected by bolts 50 to wall 38 of the baler chamber, and bracket 48 is connected to the opposite wall 39 of the baler chamber. Links 52 and 54 are pivoted by pins 56 and 58 to the extremities of arms 42 and 44 and are pivoted by pins 60 and 62 to brackets 64 and 66, the latter being welded as at 67 and 68 to the main arm 32 of the needle assembly. By virtue of this construction the hay stop arms 42 and 44 are caused to oscillate in timed relationship with the actuation of the needle assembly 22.

Figure 2:
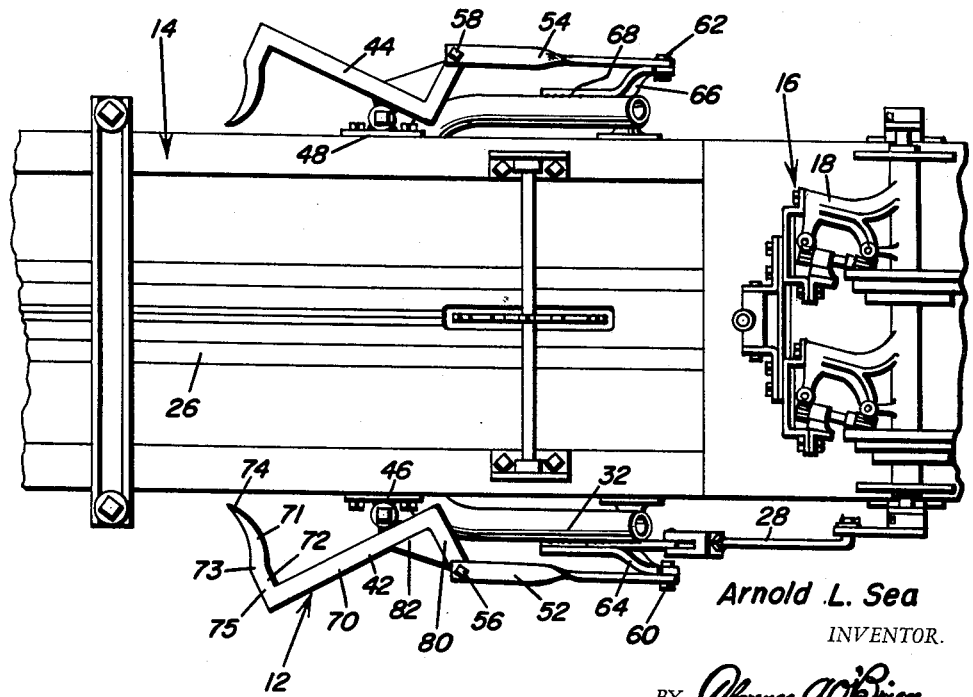
Figure 2 is a top view of the baler fragment in Figure 1.
Figure 5:
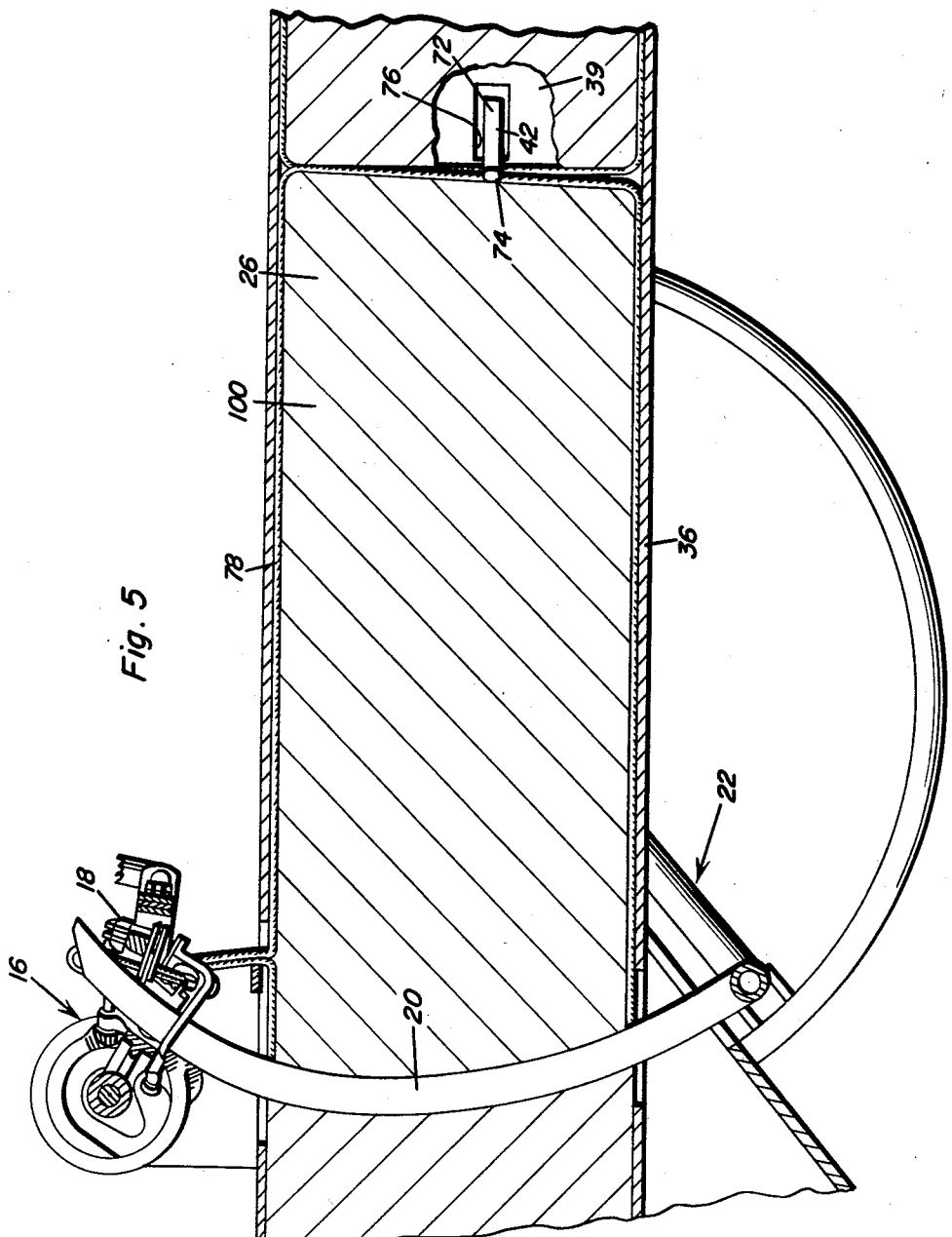
Figure 5 is a longitudinal fragmentary sectional view showing diagrammatically only a part of the baling, tying and pushing operation, the latter being caused by the hay arm in accordance with this invention.

Arm 42 has a straight intermediate part 70 and a bill 72 at one end. The bill only generally extends at right angles to the intermediate part 72, noting from inspection of Figures 2 and 4 that the bill 72 has an outer section 71 curved from the needle-like tip 74 to end 73 which is integral with inner section 75. The shape of section 75 adjacent to the portion 70 makes an angle slightly less than 90° with portions 70 that is, it is directed slightly rearward, and then approaches the tip 74 of bill 72. There is a slight reverse curvature lengthwise of section or portion 71. This is made in this way so that when bill 72 passes through opening 76 in wall 38 of chamber 26, the tip 74 and the part of the bill immediately adjacent to the tip enters the chamber 26 at approximately right angles to the wall 38 so that it may function as a stop for the hay as it is being compressed by the conventional mechanism of the baler. But as the bill 72 further penetrates chamber 26, the curvature of section 71 of bill 72 causes the bill to function as a pusher to compress the hay a short but exceedingly important distance to relax the top part 78 of the twine (Figure 5) during the knotting operation. As indicated previously most difficulties in the tier operation are attributable entirely to too much tension in the top part of the twine causing the knotter to fail to function to the extent that a knot is formed only at one end of the twine or in neither end of the twine. The hook bill 72 when operating in conjunction with the baler eliminates all of the major causes of the tier failing to tie.

Arm 42 has an angulated end portion 80 opposite to the end of portion 70 which supports bill 72. The reinforcing gusset plate 82 is connected between portion 70 and angulated end 80, and it is the extremity of angulated end 80 that accommodates pivot 56.

Link 52 is preferably twisted between its ends for strength and rigidity of construction, and bracket 64 had a slight offset between its ends for freedom of operation. The specific construction of arm 44 and all of the structure associated with it, is identical to that described in connection with hay stop arm 42. Both brackets 46 and 48 are identical. The bracket 46 is composed of a mounting plate with upper and lower aligned hinge butts 88 and 90 fixed, as by welding, to its outer surface. These butts are spaced slightly from each other, and there is a hinge pin 92 mounted in the bores of the aligned hinge butts 88 and 90. The hinge pin 92 extends through an aperture in an eye of arm 42 that may be welded as at 94 on portions 70 closer to end 80 than bill 72. This enables the arm 42 to move with a hinge action to be passed through the openings in the side walls of baler chamber 26 and to be withdrawn therefrom (compare Figures 2 and 4) in coordination with the actuation of the needle assembly 20.

In operation, the baler is used as is any other ordinary baler which is not equipped with hay stop arm assembly 12, the assembly including arms 42 and 44 on opposite sides of the baler chamber, and the described structure for hingedly oscillating the arm. As the bale 100 is being formed in the baler chamber 26 the bills of arms 42 and 44 enter the chamber 26 through the openings in the side thereof and function as a stop. The stop function of the bills of arms 42 and 44 is achieved when the bills of each enter the chamber only about half-way, that is, when the bills have approximately one-half their length projected into chamber 26 stopping the travel of the hay in the baler chamber. This enables the hay to be compacted as the hay is propelled in the baler chamber. Meanwhile the needle assembly 22 is undergoing its normal stroke. As the needle assembly continues to function, with the needles upwardly (Figure 5) through the baler chamber 26, the hay stop arms 42 and 44 continues to move inwardly of the baler chamber. Due to the curvature of the bills of the arms 42 and 44, as described previously, the tips 74 function as pushers further compacting the hay in the bale so that the portions 78 of the twine is slightly relaxed, the slight relaxation being sufficient to enable the knotter 18 to function dependably. As a result the baler may be operated faster, even to the extent of using the tractor that is used with the baler to operate in high gear or at least, a higher gear. The baler produces faster work without failing to tie the bales. Furthermore, the bales come out of the baler more uniformly compacted and considerably more solid.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a baler which has a baler chamber, a tier including a knotter, a needle assembly cooperating with the baler chamber and the knotter of the tier in the forming of the bales and the tying of the bales in the baler chamber, the improvement comprising a hay stop arm assembly, said assembly having a first hay stop arm and a second hay stop arm, each arm having an intermediate portion, means hingedly securing said intermediate portion of said arm to the baler, said baler chamber having an opening, said arm provided with a bill at one end of said portion thereof and movable into said chamber by movement in said opening, and mechanical means connected to said arm and said needle assembly to hingedly oscillate said arm in coordination with the actuation of said needle assembly.

2. In a baler which has a baler chamber, a tier including a knotter, a needle assembly cooperating with the baler chamber and the knotter of the tier in the forming of the bales and the tying of the bales in the baler chamber, the improvement comprising a hay stop arm assembly, said assembly having a first hay stop arm and a second hay stop arm, each arm having an intermediate portion, means hingedly securing said intermediate portion of said arm to the baler, said baler chamber having an opening, said arm provided with a bill at one end of said portion thereof and movable into said chamber by movement in said opening, and mechanical means connected to said arm and said needle assembly to hingedly oscillate said arm in coordination with the actuation of said needle assembly, said bill being longitudinally curved from end to end with the portion of the bill immediately adjacent to said arm portion making an acute angle therewith, and the tip portion of said bill being curved away from said intermediate portion.

3. In a baler which has a baler chamber, a tier including a knotter, a needle assembly cooperating with the baler chamber and the knotter of the tier in the forming of the bales and the tying of the bales in the baler chamber, the improvement comprising a hay stop arm assembly, said assembly having a first hay stop arm and a second hay stop arm, each arm having an intermediate portion, means hingedly securing said intermediate portion of said arm to the baler, said baler chamber having an opening, said arm provided with a bill at one end of said portion thereof and movable into said chamber by movement in said opening, and mechanical means connected to said arm and said needle assembly to hingedly oscillate said arm in coordination with the actuation of said needle assembly, said bill being longitudinally curved from end to end with the portion of the bill immediately adjacent to said arm portion making an acute angle therewith, and the tip portion of said bill being curved away from said intermediate portion, so that upon initial penetration of said bill into said chamber said tip constitutes a stop for the hay and as said bill further penetrates the baler, said tip pushes the hay in the baler chamber to compress the hay that is being formed into a bale and being tied by the tier.

4. In a hay baler which has a baler chamber provided with side walls and a bottom wall, a needle assembly operable by having needles which pass through said chamber, a tier cooperating with said needles and having twine by which to tie the bale that is being formed in the baler chamber, the improvement comprising a hay stop arm assembly having a pair of hay stop arms, means mounting said hay stop arms intermediate their ends on the sides of the baler chamber, said baler chamber sides having openings, each arm having a bill at one end thereof which is movable in said opening to enter the baler chamber, linkages, means pivoting one linkage to one of said arms, means pivoting the other linkage to the other of said arms, pivotal means connecting said linkages to said needle assembly necessitating and producing hinged movement of said arms in coordination with the movement of said needles of said needle assembly with said arms moved in a direction to have the bills thereof first enter said baler chamber and constitute a stop against which the hay in the baler chamber abuts as said needle assembly commences its operation, and said bills having curved portions between their ends to constitute pushers as the bills further penetrate said chamber and compress the hay in the chamber thereby relaxing a portion of said twine to facilitate tying by said tier.

5. In a hay baler which has a baler chamber provided with side walls and a bottom wall, a needle assembly operable by having needles which pass through said chamber, a tier cooperating with said needles and having twine by which to tie the bale that is being formed in the baler chamber, the improvement comprising a hay stop arm assembly having a pair of hay stop arms, means mounting said hay stop arms intermediate their ends on the sides of the baler chamber, said baler chamber sides having openings, each arm having a bill at one end thereof which is movable in said opening to enter the baler chamber, linkages, means pivoting one linkage to one of said arms, means pivoting the other linkage to the other of said arms, pivotal means connecting said linkages to said needle assembly necessitating and producing hinged movement of said arms in coordination with the movement of said needles of said needle assembly with said arms moved in a direction to have the bills thereof first enter said baler chamber and constitute a stop against which the hay in the baler chamber abuts as said needle assembly commences its operation, and said bills having curved portions between their ends to constitute pushers as the bills further penetrate said chamber and compress the hay in the chamber thereby relaxing a portion of said twine to facilitate tying by said tier, said bills each constructed of a portion nearest to an intermediate straight part of said arm which makes an acute angle with said arm, and a tip which curves in a direction away from said arm portion.

6. In a hay baler which has a baler chamber provided with side walls and a bottom wall, a needle assembly operable by having needles which pass through said chamber, a tier cooperating with said needles and having twine by which to tie the bale that is being formed in the baler chamber, the improvement comprising a hay stop arm assembly having a pair of hay stop arms, means mounting said hay stop arms intermediate their ends on the sides of the baler chamber, said baler chamber sides having openings, each arm having a bill at one end thereof which is movable in said opening to enter the baler chamber, linkages, means pivoting one linkage to one of said arms, means pivoting the other linkage to the other of said arms, pivotal means connecting said linkages to said needle assembly necessitating and producing hinged movement of said arms in coordination with the movement of said needles of said needle assembly with said arms moved in a direction to have the bills thereof first enter said baler chamber and constitute a stop against which the hay in the baler chamber abuts as said needle assembly commences its operation, and said bills having curved portions between their ends to constitute pushers as the bills further penetrate said chamber and compress the hay in the chamber thereby relaxing a portion of said twine to facilitate tying by said tier, each bill of each hay stop arm having a tip possessing said curvature.

7. A hay arm stop assembly for a baler which has a needle assembly including a main arm, said hay stop arm assembly comprising a pair of hay stop arms, means hingedly connected to each arm intermediate its ends for mounting said arms for pivotal movement on the sides of a baler, angulated and curved ends on said arms and adapted to penetrate the baler chamber of the baler, and mechanical means connected to the opposite ends of said arm and to said main arm for hingedly actuating said arms in coordination with the actuation of said needle assembly.

8. In a hay baler which has a needle assembly and a baler chamber provided with side openings, a pair of hay stop arms including a pair of hay stops and a pair of hay pushers operable to stop and push the hay successively, said hay stops and said pushers consisting of end portions of said arms which move in said openings with the tips of said end portions of said arms constituting said stops and also constituting said pushers with the first entry of said tips into said baler chamber forming a barrier against which the hay that is moved by the baler in the chamber abuts, and upon further inward movement of said tips slightly push the hay to compact the hay in the baler chamber, and link means operatively connecting said arms with said needle assembly to hingedly oscillate said arms in response to and in coordination with the movement of said needle assembly.

9. The combination of claim 8 wherein the baler has a tier to tie the bale with twine that extends in part over the top of the hay in the baler chamber, and upon compacting of the hay in said baler chamber by movement of said tips, the top part of the twine becomes relaxed to facilitate tying of the bale by said tier.

References Cited in the file of this patent

UNITED STATES PATENTS

| | | |
|---|---|---|
| 2,080,316 | Innes | May 11, 1937 |
| 2,691,340 | Nikkel | Oct. 12, 1954 |